United States Patent [19]

McCoomb

[11] 4,094,363

[45] June 13, 1978

[54] CULTIVATING IMPLEMENTS

[75] Inventor: John Michael McCoomb, Auckland, New Zealand

[73] Assignee: Spintiller International Limited, Auckland, New Zealand

[21] Appl. No.: 819,994

[22] Filed: Jul. 28, 1977

Related U.S. Application Data

[63] Continuation of Ser. No. 633,949, Nov. 20, 1975, abandoned, which is a continuation of Ser. No. 485,597, Jul. 3, 1974, abandoned, which is a continuation of Ser. No. 340,747, Mar. 13, 1973, abandoned.

[30] Foreign Application Priority Data

Mar. 13, 1972 New Zealand .................. 166562

[51] Int. Cl.$^2$ ............................................ A01B 21/04
[52] U.S. Cl. ................................. 172/349; 172/548; 172/21; 172/651
[58] Field of Search .............. 172/349, 350, 555, 548, 172/540, 549, 21, 556, 551, 547

[56] References Cited

U.S. PATENT DOCUMENTS

| | | | |
|---|---|---|---|
| 836,588 | 11/1906 | Laursen | 172/540 |
| 1,486,053 | 3/1924 | Stewart | 172/349 |
| 2,509,463 | 5/1950 | Wade | 172/547 |
| 2,559,232 | 7/1951 | Simon | 172/556 |
| 2,664,040 | 12/1953 | Beard | 172/548 |
| 3,232,356 | 2/1966 | Whitesides | 172/548 |
| 3,640,347 | 2/1972 | Miller | 172/349 |
| 3,650,334 | 3/1972 | Hagenstad | 172/540 |
| 3,766,988 | 10/1973 | Whitesides | 172/548 |

FOREIGN PATENT DOCUMENTS 26,167 of 1897 United Kingdom .................. 172/349

*Primary Examiner*—Richard J. Johnson
*Attorney, Agent, or Firm*—Holman & Stern

[57] ABSTRACT

A cultivating implement having freely rotatable tine members mounted on axles set at an angle other than normal to the direction of travel of the implement over the ground, the tine members comprising a plurality of forwardly arcuately curved tines having chisel shaped tips which produce sideways cutting action through the soil as the implement is moved over the ground.

5 Claims, 6 Drawing Figures

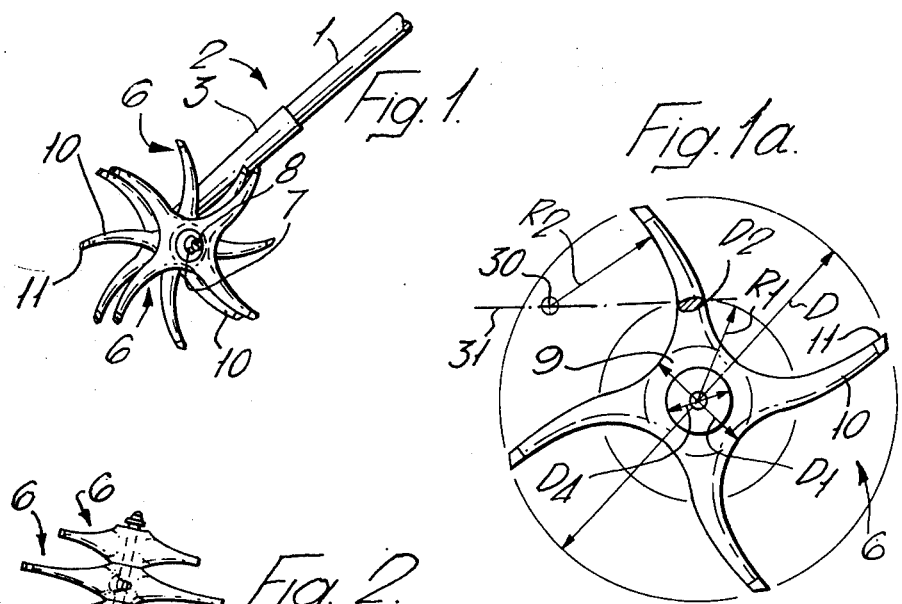
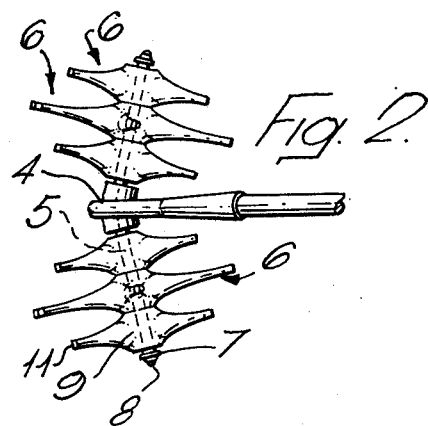
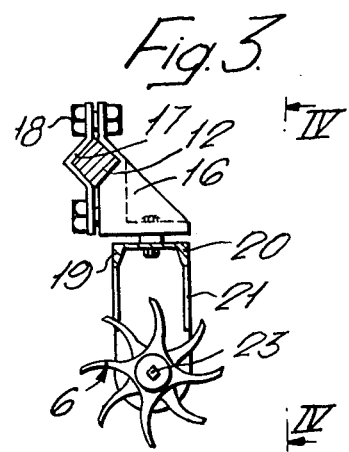
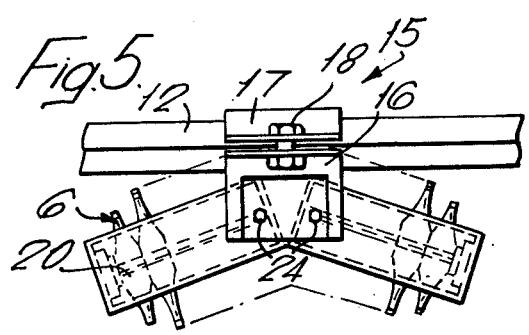

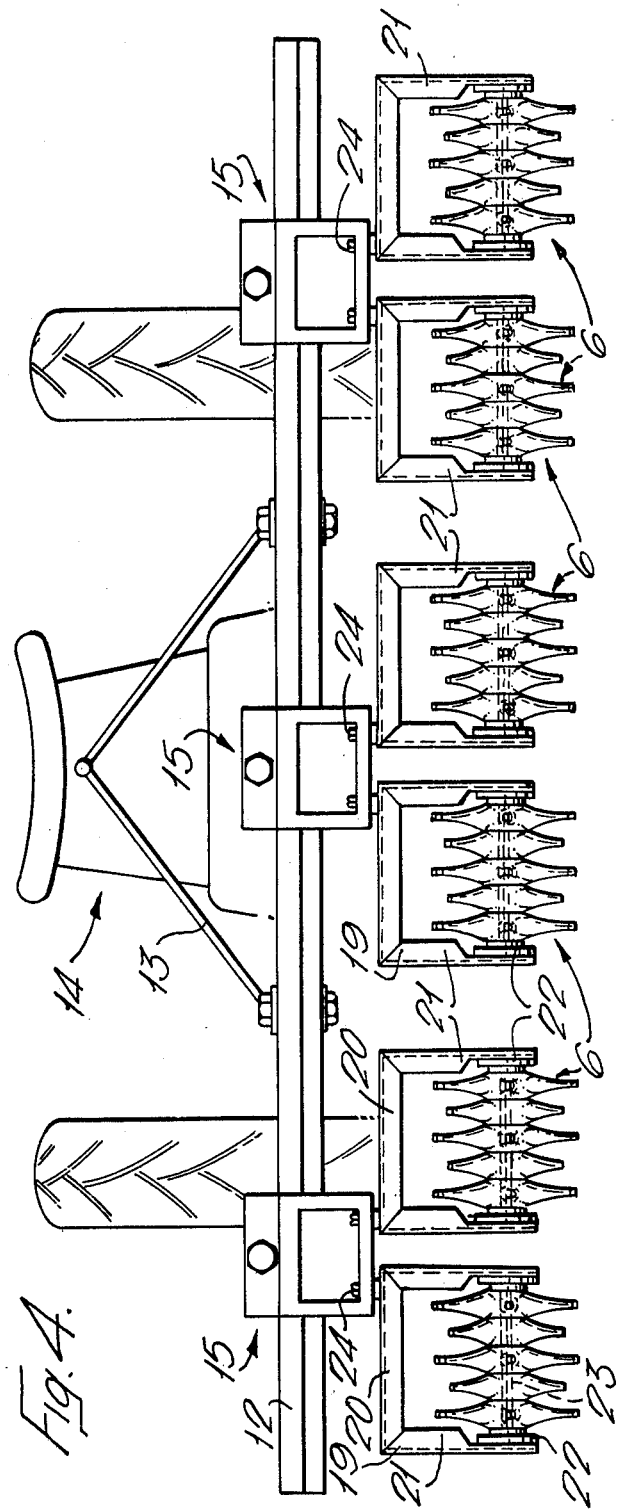

CULTIVATING IMPLEMENTS

This is a continuation of application Ser. No. 633,949, filed Nov. 20, 1975 which in turn is continuation of Ser. No. 485,597, filed July 3, 1974, which is in turn continuation of Ser. No. 340,747, filed Mar. 13, 1973 which are now abandoned.

This invention relates to cultivating implements and has been devised particularly though not solely for use as a tine cultivator.

There exists a need for a tine cultivator for preparing and maintaining a fine tilth on the surface of the soil, for example, between rows of vegetables and/or seedlings. In the past fixed tine cultivators have been used to prepare a tilth and maintain it as the crops grow. However these implements require considerable effort in use and there is a danger of cutting or otherwise damaging the root system of the plant being cultivated and this is of considerable disadvantage to their effective use. Because of this, in more recent years, there has been a growing use of weedicides which do not however have the beneficial effects of some mechanical form of cultivation which will aerate the soil and in some cases over a period of considerable use soils may have to be allowed to lie fallow to leach out excess weedicides.

It is therefore an object of the present invention to provide a cultivating implement which may be hand operated or in an alternative construction may be mechanically drawn and which will overcome or minimise the foregoing disadvantages in a simple yet effective manner or which will at least provide the public with a useful choice.

Accordingly in one aspect the invention consists in a cultivating implement adapted to be run over the ground comprising a head adapted to be moved over the ground said head mounting a pair of axle members, each said axle member extending outwardly and at an angle other than normal to the direction of movement over the ground one each side of said head, and at least one rotatable tine member mounted on each of said axle members, each rotatable tine member being adapted to be freely rotatable on its axle member independently of any other such member so as to till the ground.

The invention consists in the foregoing and also envisages constructions of which the following gives examples only and where specific integers are mentioned herein which have known equivalents in the art to which this invention relates, such known equivalents are deemed to be incorporated herein as if individually set forth.

One preferred form of the invention will now be described with reference to the accompanying drawings in which FIG. 1 is an elevation of the preferred form of the invention, FIG. 1a is an elevation of a tine member in FIG. 1, FIG. 2 is a plan view of FIG. 1, FIG. 3 is a sectional elevation of the invention adapted to be drawn behind a vehicle FIG. 4 is a view on line IV—IV on FIG. 3 and FIG. 5 is a plan view of FIG. 3 with the tines in an angled position.

In the preferred form of the invention, a cultivating implement is provided as follows:

A shaft or handle 1 (FIG. 1) is provided of any suitable material for example timber or metal tube and the shaft 1 has mounted at one end, a throat member 2 which has a tapered socket portion 3 to match a taper provided on the shaft or handle 1. The throat member 2 extends forwardly along the axis of the shaft or handle 1 and terminates in a portion 4 which is U shaped in cross section. Passing through the sides of the U shaped portion 4 are a pair of axle members 5 comprising a length of rod, for example $\frac{1}{2}$ inch diameter mild steel. The axle member 5 extends an equal distance on either side of the head or throat member 2 and it has been found most satisfactory to form the axle members 5 with a backward sweep so that there is an included angle of substantially 160° between the axes of each axle member 5 and the plane in which the axes of the axle member 5 lie is arranged at an angle of substantially 40° below the axis of the handle or shaft 1. Thus when in use the handle or shaft extends upwardly from the horizontal at an angle of substantially 40°, the plane of the axle members 5 would then be substantially horizontal and the axle members 5 would extend rearwardly of the throat member 2.

The length of the axle members 5 is determined by the number of tine members 6 (FIG. 1a) to be assembled on each axle member 5. The ends of the axle members 5 are adapted in any known way to retain the tine members on the axle 5, for example, by providing a turned washer 7 secured to the end of the axle member 5 by a screw 8, however other methods may be used, for example, by providing a groove and a circlip or by drilling the end of the axle member and providing a washer and split pin through the drilled hole. The tine members 6 are preferably cast from a suitable material, for example, malleable iron and comprise a barrel shaped central boss 9 which is provided with an aperture concentric with the boss 9 and which is of sufficient diameter to provide a free running fit on the axle member 5. Radiating from the boss 9 are a plurality of tines 10 and preferably 4 or 5 tines are provided which are curved and extend radially approximately $3\frac{1}{4}$ from the centre of the boss 9. The tines 10 are substantially circular in cross section and this cross section reduces in diameter progressively and becomes oval towards the outer ends, the tips 11 terminating as a flattened chisel shape cutting edge. The tines 10 lie substantially in the same plane and each tine is arcuately curved in the same direction within that plane. Preferably when more than one tine member 6 is mounted on each axle member 5 each tine member 6 is arranged such that the tines 10 of a first tire member 6 are offset radially from the tines 10 of an adjacent tine member 6 so that the tines 10 of the first tine member lie midway between the tines 10 of the adjacent tine member. To maintain these relative offset positions the adjacent faces of the adjacent bosses 9 are provided with interlocking means, for example, the end faces of each boss 9 may be drilled at an appropriate position to provide the required alignment between each boss 9 and a pin (not shown) may be entered into both holes (one in each adjacent boss) to prevent rotational movement between the tine members 6.

A suitable tine member 6 may be, for example, of the following dimensions:

Referring to FIG. 1a the diameter D of the tine member 6 may be $6\frac{5}{8}$ inches and have a boss diameter D1 of $1\frac{1}{2}$ inches with a thickness of $1\frac{1}{4}$ inch. The axis of the base of each tine lies on a radius and forms a smooth transition from the base diameter at D1 to a circular cross section of $\frac{3}{8}$ diameter D2 at a radius R1 of $1\frac{5}{8}$ from the axis of the boss 9. The curved tip 11 of the tine is developed about an axis lying on a radius R2 of 2 3/16 inches which has a centre rotation 30 on a tangent 31 to a circle of radius R1, the tangent 31 being normal to the axis of the base of the tine. There is smooth transition from the diameter D2 to a chisel shaped tip 11 approximately 9/16 inch wide. The boss 9 is crowned having downwardly sloping portions at approximately 7° smoothing out to approximately 2° at the edge of the boss to form a side face diameter D4 of approximately 1 3/16 inches diameter. The tine members 6 may be provided with any number of tines preferably 4 or 5 tines equally spaced are provided. Such tine members are mounted on the axle member 5 so that the tips of the tines curve forwardly in the direction of travel of the implement over the ground.

In some cultivating operations it may be desirable to provide a guard or shield to prevent the tines from entangling with overhanging foliage and to this end a guard or shield may be provided of suitable material, for example, sheet steel or fibre glass which may be formed to a radius which will provide a desired clearance between the inside surface of the guard or shield and the tips of the tines. This guard or shield extends across the full width of the tine members and it is turned downwardly at the edges to cover the sides of the tines and these downwardly turned edges may be further extended to be supported on the projecting end of the axle member 5. The guard member may also be further supported from the throat member or handle. Such tine members 6 are mounted on the axle member 5 so that the outer portion of the tine from D2 curves in the direction of the travel of the implement is run forwardly over the ground. Any number of tine members 6 may be mounted on either side of the throat member 4 and preferably one or two tine members 6 are mounted on each side of the throat member 4.

From the foregoing it will be seen that a cultivating implement can be produced which when pushed along the soil between the rows of plants being cultivated or pushed over freshly dug soil will rotate and by virtue of its weight and any additional pressure cause the tines to penetrate the soil and break the surface of the soil into a fine tilth. The backward sweep of the axle members 5 causes the tines 10 to move through the soil with a sideways slicing action. In other words as the tine member 6 rotates the tips 11 of the tines 10 on each tine member 6 enter the soil at a greater distance from the axis of the handle member 1 than the distance from the axis of the handle member 1 to the tip of the tine 11 when the tip of the tine 11 leaves the soil.

The invention further envisages a cultivating implement of larger proportions which may be drawn behind a powered vehicle such as a tractor and such an implement may be made as follows:

A carrying bar 12 (FIGS. 3 and 4) preferably of square section is provided adapted to suitably connect with the three point linkage 13 of a tractor 14 and mounted on the carrying bar 12 is a plurality of head members 15. Each head member 15 comprises a body 16 and a clamp member 17 arranged so that the body 16 and the clamp member 17 pass around opposite sides of the carrying bar 12 so that clamping bolts 18 which pass through the body member 16 and the clamping bar 17 may be tightened to clamp the head member 15 in any desired position along the length of the carrying bar 12. Mounted below the body member 16 and rotatable on a substantially vertical axis is a frame 19 having a transverse portion 20 and a pair of downwardly extending side members 21 at each end which carry at their lower ends bearings 22 in which an axle 23 is arranged to rotate. The axle 23 entends between the bearings 22 and is preferably of square section having the end portions turned to a suitable diameter to engage the bearings 22. A plurality o tine members 6 are mounted on the shaft 23 and each tine member 6 has a boss 9 as previously described and tines 10. The boss 9 is provided with a square aperture and each alternate tine member 6 is arranged so that the tines are offset radially so that alternate tine members 6 have their tines 10 projecting radially intermediate of tines 10 of the next adjacent tine member 6. The frame 19 is provided with an aperture adjacent one end so that it may be mounted on a substantially vertical axis and clamped to the body portion 16 of the head member by a securing bolt 24 on which the frame member 19 is hinged so that the position of the frame member 19 relative to the direction of travel of the tractor may be varied to provide a desired amount of angle cut by the tine members 6 in operation. Thus a plurality of frames 19 and their associates tine members 6 may be spaced apart at any desired interval along the carrying bar 12 and the frame 19 adjusted to provide the desired amount of cross cutting.

If desired trays or other supporting arms may be provided from the body portion 16 of the head member 15 in which additional weights and or other means of downward pressure may be placed to produce a desired load on the tines to aid their penetration into the soil to a desired depth.

Such an arrangement of tine assemblies has many advantages particularly in cultivating between rows of plants or seedlings in large nurseries as the tine assemblies may be positioned on the carrying bar 12 so that they are centrally placed between rows of plants and seedlings and thus aeration and breaking up of the upper layer of top soil may be achieved with no damage to the crops being grown. Such a method has an advantage over spraying weedicides to control weed growth as the apparatus provides a dual function of controlling weed growth and aeration of the top soil with no increase in labour costs involved but with the additional advantage of eliminating the possibility of souring the soil through continual use of weedicides thus making it necessary for the soil to lie fallow while such weedicides are leached out.

Either embodiment of the invention may be used to aerate the soil in the following manner.

The manual operable embodiment of the invention may simply be turned over so that the tines operate in a reverse direction, that is, the curved tip 11 of the tines curves away from the direction of rotation so that the tip 11 of the tine enters the soil without any lifting of the soil but due to the heavy proportions of the tine member the tine penetrates the soil a suitable distance for aeration purposes and as the tine member rotates further the tine leaves the soil substantially tangentially to the curve of the tip 11 thus not lifting and damaging the turf being aerated.

Similarly with the gangs of tine members as described in the embodiment for drawing behind a vehicle aeration of the soil may be effected by interchanging the head member 19 and changing the axis of rotation of the tine members 6 to normal to the direction of travel of the vehicle so that tines are rotated in the reverse manner described above. This gives a light aeration of pasture or turf but where a heavy action is required the heads 19 may be turned to an angle from that normal to the direction of travel. Alternatively the machine may be used as for cultivation with little or no set to the head 19 relative to the direction of travel of the vehicle to give a light lifting action to the tine tips giving a heavier aeration action.

From the foregoing it can be seen that a cultivating implement may be made which can provide not only cultivation of the soil but may be used for aeration of the soil, turf or pasture.

I claim:

1. A cultivating implement for cultivating the ground by movement thereover, said implement comprising a head member disposed so as to be movable over the ground; a pair of axles extending one on each side of said head member outwardly and at an included angle of substantially 160°, the axles in use lying substantially in a plane parallel to the ground; at least one tined spider means of diameter D freely rotatably mounted on each said axle about a center axis of the spider means, each spider means being unitarily and integrally formed and having a boss of diameter of approximately 0.23D and four or five cantilever mounted tines radiating from said boss each to a free end, each tine having a base of circular cross section adjoining said boss, the tine extending radially from said base to a plane at a distance of approximately 0.2D from the center axis of the spider means and then being arcuately curved along its remaining length curving forwardly in the direction of movement in use of the implement with a radius of approximately 0.3D from a center on a tangent to a circle of radius approximately 0.2D, said tangent being normal to the axis of the base of the tine, adjacent sides of adjacent tines curving smoothly into each other, the tines progressively reducing in cross-section from the boss to their free ends, the base of each tine having a diameter of approximately 0.2D where it adjoins the boss, a diameter of approximately 0.06D at said plane, thereafter the cross section of the tine becoming oval towards the free end of the tine and the tine terminating at said free end in a chisel-shaped cutting edge lying in a plane substantially parallel to the axle upon which the respective spider means is mounted; the progressive reduction in cross section of the tines resulting in any particular cross section of a tine having a perimeter length no greater than the perimeter length of another cross section of the tine which is closer to the boss than said particular cross section.

2. A cultivating implement as claimed in claim 1 wherein at least two tined spider means are mounted on each axle in fixed staggered relationship to each other.

3. A cultivating implement for cultivating the ground by movement thereover, said implement comprising a hand operated unit having:

handle means disposed so as to be movable over the ground;

a pair of outwardly extending fixed axles one on each side of said handle means and at an included angle of substantially 160° with the apex of said angle being directed forwardly in use, said axles being positioned such that a plane containing the axes of said axle members is substantially parallel to the ground when said handle means is held at or substantially 40° to the ground; at least one tined spider means of diameter D freely rotatably mounted on each axle about a center axis of the spider means, each spider means being unitarily and integrally formed and having a boss of diameter of approximately 0.23D and four or five cantilever mounted tines radiating from said boss each to a free end, each tine having a base of circular cross section adjoining said boss, the tine extending radially from said base to a plane at a distance of approximately 0.2D from the center axis of the spider means and then being arcuately curved along its remaining length curving forwardly in the direction of movement in use of the implement with a radius of approximately 0.3D from a center on a tangent to a circle of radius approximately 0.2D. said tangent being normal to the axis of the base of the tine, adjacent sides of adjacent tines curving smoothly into each other, the tines progressively reducing in cross section from the boss to their free ends, the base of each tine having a diameter of approximately 0.2D where it adjoins the boss, such diameter reducing to a diameter of approximately 0.06D at said plane, thereafter the cross section of the tine becoming oval towards the free end of the tine and the tine terminating at said free end in a chisel shaped cutting edge lying in a plane substantially parallel to the axle upon which the respective spider means is mounted, the progressive reduction in cross section of the tines resulting in any particular cross section of a tine having a perimeter length which is no greater than the perimeter length of another cross section of the tine closer to the boss than said particular cross section.

4. A cultivating assembly to be run over the ground comprising a vehicle, a frame mounted on said vehicle and a cultivating implement mounted in said frame, said implement comprising a head member disposed so as to be movable over the ground; a pair of axles extending one on each side of said head member outwardly and at an included angle of substantially 160°, the axles in use lying substantially in a plane parallel to the ground; at least one tined spider means of diameter D freely rotatably mounted on each axle about a center axis of the respective spider means, each spider means being unitarily and integrally formed and having a boss of diameter of approximately 0.23D and four or five cantilever mounted tines radiating from said boss each to a free end, each tine having a base of circular cross section adjoining said boss, the tine extending radially from said boss to a plane at distance of approximately 0.2D from the center axis of the spider means and then being arcuately curved along its remaining length curving forwardly in the direction of movement in use of the implement with a radius of approximately 0.3D from a center on a tangent to a circle of radius approximately 0.2D, said tangent being normal to the axis of the base of the tine, adjacent sides of adjacent tines curving smoothly into each other, the tines progressively reducing in cross section from the boss to their free ends, the base of each tine having a diameter of approximately 0.2D where it adjoins the boss, such diameter reducing to a diameter of approximately 0.06D at said plane, thereafter the cross section becoming oval towards the free end of the tine and the tine terminating at said free end in a chisel-shaped cutting edge lying in a plane substantially parallel to the axle upon which the respective spider means is mounted, the progressive reduction in cross section of the tine resulting in any particular cross section of the tine having a perimeter length which is no greater than the perimeter length of another cross section of the tine closer to the boss than said particular cross section.

5. A cultivating assembly as claimed in claim 4 wherein said head member comprises a mounting portion to mount said head member on said frame, said head member having at least two frame portions rotatably adjustable on a substantially vertical axis and mounting each axle in a substantially horizontal plane at an angle of approximately 80° to the direction of travel of said cultivating implement.

* * * * *